United States Patent [19]
de Carle

[11] Patent Number: 5,798,817
[45] Date of Patent: Aug. 25, 1998

[54] BIFOCAL CONTACT LENSES

[75] Inventor: John Trevor de Carle, Tilford, United Kingdom

[73] Assignee: Aspect Vision Care Ltd., Southampton, United Kingdom

[21] Appl. No.: 563,454

[22] Filed: Nov. 28, 1995

[30] Foreign Application Priority Data

Nov. 30, 1994 [GB] United Kingdom ............ 9424174

[51] Int. Cl.$^6$ ..................................... G02C 7/04
[52] U.S. Cl. ........................................ 351/161
[58] Field of Search ................. 351/160 R, 160 H, 351/161, 162

[56] References Cited

U.S. PATENT DOCUMENTS

| | | | |
|---|---|---|---|
| 4,162,122 | 7/1979 | Cohen | 351/161 |
| 4,890,913 | 1/1990 | De Carle | 351/161 |
| 4,898,461 | 2/1990 | Portney | 351/161 |
| 5,326,348 | 7/1994 | Nordan | 623/6 |

FOREIGN PATENT DOCUMENTS

| | | |
|---|---|---|
| 0445994A2 | 9/1991 | European Pat. Off. . |
| 0574590A1 | 12/1993 | European Pat. Off. . |
| 2129155A | 5/1984 | United Kingdom . |
| WO 92/22264 | 12/1992 | WIPO . |

*Primary Examiner*—Scott J. Sugarman
*Attorney, Agent, or Firm*—Sughrue, Mion, Zinn, Macpeak & Seas, PLLC

[57] ABSTRACT

A bifocal contact lens has a viewing area divided into a plurality of near vision zones (1,3A) and distance vision zones (2,2A, 3) which are substantially concentric with respect to the optical axis (P,Q) of the lens. Each near vision zone is adjacent to a distance vision zone or to a middle distance zone and at least one of the near vision zones comprises an aspherical lenticular surface. An important advantage of the lens is that the aspherical surface can be merged into an adjacent spherical surface with less discontinuity at the junction between the adjacent zones.

4 Claims, 2 Drawing Sheets

BIFOCAL CONTACT LENSES

FIELD OF THE INVENTION

This invention relates to multifocal contact lenses and, in particular, to bifocal contact lenses.

BACKGROUND OF THE INVENTION

The vast majority of contact lenses which are currently prescribed are single vision lenses. Primarily, this is because of the difficulty in designing a contact lens which satisfactorily corrects the vision defects of presbyopics.

Commercial bifocal lenses have been designed in which the distance vision is provided by the power curvature of the lens, while the reading vision is achieved by means of a diffractive phase plate usually formed on the inner face of the lens. Generally, the diffractive part of the lens is quite small and, as a result, it is difficult to maintain a good balance between light entering through the distance vision areas and through the diffractive part of the lens. Unless, perfect centration is obtained of a lens on the eyeball with a very small pupil size the result is acceptable distance vision with a rather poor superimposed near vision image. As a result of these difficulties, bifocal contact lenses have not been widely adopted and, probably represent less than 1% of contact lenses in use.

In UK Patent No. 2,129,155 and U.S. Pat. No. 4,890,913 there is described a bifocal contact lens in which the major viewing area is divided into a series of generally concentric, alternating near and distance vision zones. The sizes of the zones are selected so that whatever the relative position of the lens with respect to the pupil, the eye receives a substantial balance of light through the distance and near vision zones. Lenses of the kind described in the above patents have been shown to be advantageous in that they provide clear images both for distance vision and for reading. The patient quickly learns to ignore the distance image when reading and vice versa. Such lenses are, however, difficult to manufacture, the main drawback being the difficulty of avoiding sharp discontinuities in the lenticular surfaces at the junctions between adjacent zones.

An object of the present invention is, therefore, to overcome the above difficulties of the prior art bifocal lenses.

SUMMARY OF THE INVENTION

According to one aspect of the present invention, there is provided a bifocal contact lens wherein at least the major viewing area is divided into a multiplicity of near and distance vision zones which are substantially concentric with respect to the optical axis of the lens, and wherein each near vision zone is, adjacent to a distance vision zone or to a middle distance zone, at least one of the near vision zones comprising an aspherical lenticular surface.

By the term "multiplicity of near and distance vision zones", it is meant that the lens has more than three viewing zones in all. In most lenses in accordance with the invention, there will be at least two of each type of viewing zones and there usually there will be more zones, e.g. six or eight or more. Furthermore, in order to avoid unnecessary repetition, the term "bifocal" is used in this specification and claims to include trifocal or other multifocal lenses where the context admits.

According to a further aspect of the present invention there is provided a bifocal contact lens which comprises a plurality of substantially concentric viewing zones of alternate distance and near vision powers, wherein the distance vision zones have a substantially spherical lenticular surface, while the near vision zones have a lenticular surface which is at least partially aspherical.

A major advantage of providing near vision zones which are at least partially aspherical, is that it is possible to merge an aspherical lens surface into a spherical lens surface with less discontinuity at the junction between the two zones. In manufacturing a bifocal lens in accordance with the invention, one is therefore able to produce the desired distance and near vision zones by a continuously changing curvature in the region of the junctions.

According to a further aspect of the present invention, therefore, there is provided a method of forming a bifocal contact lens, which comprises cutting a first lenticular curve which is substantially spherical on a front or rear surface of the lens blank, said first curve representing a distance vision correction and cutting one or more second lenticular curves representing near vision zones on the same surface, by moving the position of the lens blank relatively to the cutting tool so as to cut an aspherical surface in said near vision zones.

DETAILED DESCRIPTION OF THE INVENTION

Concentric viewing zones can be cut on the power or base curve of the lens. However, for soft lenses and especially high water content lenses, it is preferred to cut the zones in the power curve of the lens. This is because very high water content or very thin lenses may tend to collapse onto the cornea unless the zones are very narrow. It is preferred to cut the lens surfaces continuously and this can be done, for example, using a precision lens lathe having computer control of the radius arm and headstock movement.

Using such a lathe, the distance vision portion may be cut by traversing the radius arm relative to the optical axis of the work piece. By keeping the radius constant and varying the axial movement of the headstock, an aspherical curve can be cut in a concentric area adjacent the distant vision zone. The amount of reading power addition depends on the velocity and acceleration of movement of the headstock with respect to the radius arm. Movement of the headstock can then be arrested so that the radius tool then resumes cutting the distance power on the lens surface, to form a second concentric ring of distance vision power. The headstock can then be moved further in order to form a further reading power zone, next to the distance power zone.

In a computer-controlled lathe, the linear movement of the headstock is generally controlled by a stepper motor and by varying the speed and acceleration of the motor driving the headstock and the rate of cutting by the radius arm, various different effects are achieved. A rapid acceleration of the headstock will mean that a majority of the reading power zone is of the maximum reading power, whereas a slow acceleration-will result in a gradual build up to the maximum reading power, and a gradual reduction back to the distance vision zone.

By varying the parameters of the movement of the headstock and the radius arm, reading zones which vary from being about 10% aspherical to wholly aspherical can be achieved. The degree of asphericity will vary over the width of the concentric ring.

The above technique can be applied both to cutting the base curve or the power curve.

It will be appreciated that an aspherical curve could also be obtained by changing the radius of the radius arm as the cutting tool moves over and defines the concentric reading zone. This, however, would give slightly different distance power to each ring. The invention does, however, include a modified manufacturing process in which the radius may be changed along with movement of the headstock.

While the manufacture of lenses in accordance with this invention has been described above with reference to machining, it will be appreciated that the lenses of the present invention can be moulded. However, the initial manufacturing step of defining a lens surface having alternating spherical and aspherical vision zones may be more conveniently defined by cutting such zones on a master from which the moulding tools are produced.

The invention will be illustrated by the following description and accompanying drawings, in which.

Figure 1:
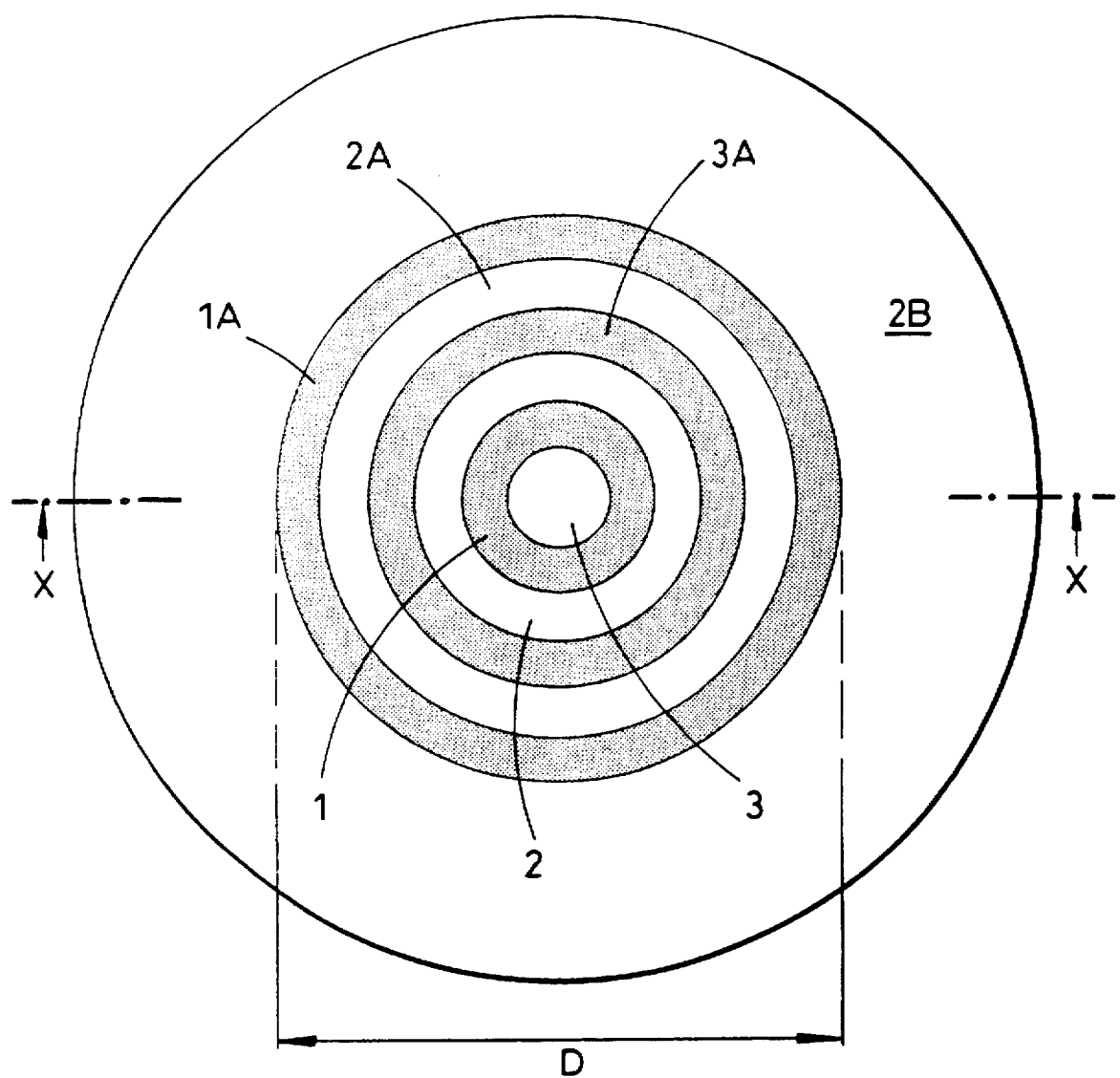
FIG. 1 is a plan view of a bifocal contact lens.

Referring to FIG. 1, it will be seen that the lens has a central viewing area which is divided into a number of concentric rings. For identification, the near vision zone 1, 1A and 3a are shaded and the distance vision zones 2, 2A and 3 are unmarked. Preferably, the lens has a central vision zone 3 for distance vision viewing and the area 2B outside the central viewing area is cut for distance vision also. The overall diameter D of the central viewing area may be from about 4.5 to 8 mms to substantially the whole of the surface of the lens. However, generally the viewing area will be at least 6.5 to 7 mms in diameter. However, the pattern of concentric zones could, if desired, cover the entire surface of the contact lens. In general, it is sufficient for the pattern of concentric zones to cover the normal pupil area at maximum aperture.

The pattern of reading and distance vision zones may be formed either on the posterior or anterior surfaces of the lens or on both, although in the case of high water content lenses and very thin lenses, the zones are preferably formed in the front power surface. In practice, it is generally more convenient to form the pattern of zones by machining the anterior or power curve of the lens.

The width, number and relative size of the alternating zones should be selected so that independently of the size of the wearer's iris, substantially equal amounts of light reach the eye from the reading and distance vision zones. In this connection, by "substantially equal" is meant amounts from 60:40 to 40:60 from the two types of zones. Further details of this aspect of the design of the lenses can be found in the above-mentioned UK Patent No. 2,129,155 and U.S. Pat. No. 4,890,913, the contents of which are specifically incorporated herein by reference.

Figure 2:
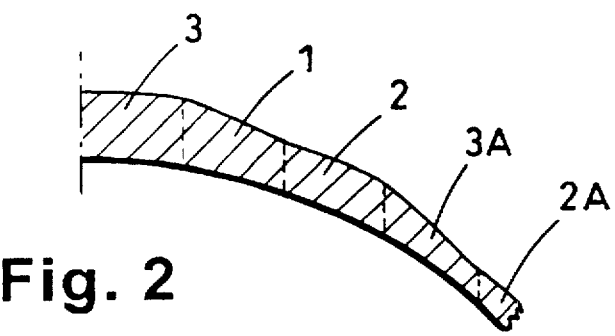
FIG. 2 is a sectional view, showing part of the concentric viewing zones.

FIG. 2 is a partial section along the line X—X in FIG. 1. It will be seen that the distance vision zones 3, 2 and 2A have spherical radii on their front surfaces. Reading vision is provided in zones 1 and 3A by means of aspherical curves on the front surface of the lenses. A smooth transition exists between the zones because they are formed in a continuous movement of the radius arm.

The zones are formed preferably on a computer-controlled lathe by setting the lathe initially to the distance vision curvature. At the point where it is desired to form the first near vision ring, the position of the headstock with respect to the radius arm is changed by means of a stepper motor which drives the headstock on the bed of the lathe.

Figure 3:
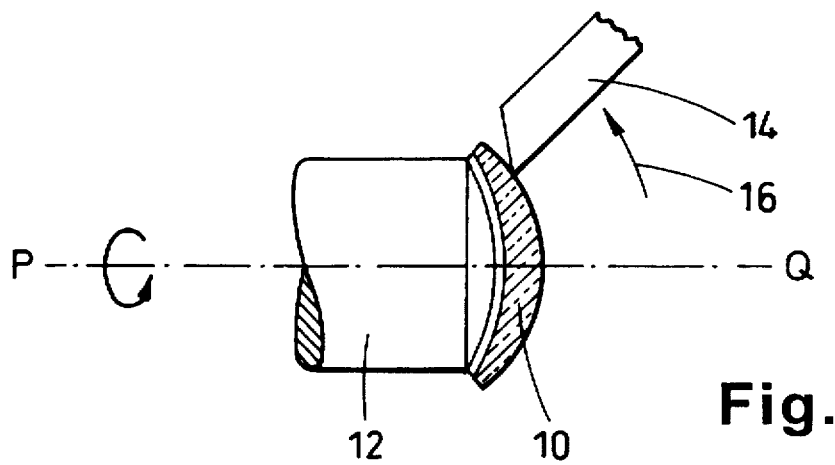
FIG. 3 is a diagrammatic view of a lens lathe headstock and radius arm.

The lathe and the movement of the headstock with respect to the radius arm is shown diagrammatically in FIGS. 3, 4A, 4B and 4C. Referring to FIG. 3, this shows a lens blank 10 temporarily attached to a headstock 12, e.g. with adhesive. A power curve is cut on the front surface of the lens blank 10 by cutting with a diamond tool mounted on a radius arm 14. The headstock is rotated on a centre line P–Q which may or may not be the optical axis of the final machined lens. Radius arm 14 can be traversed as shown by the arrow 16 across the centre line. P–Q.

The position of the headstock along the centre line P–Q can be varied by means of a computer controlled stepper motor (not shown). It is possible to subject the headstock to various sequences of movement and some possibilities are shown in the headstock movement diagrams shown in FIGS. 4A, 4B and 4C. In these diagrams, X represents maximum headstock speed, Y represents zero headstock speed and T is time from the commencement of the machining operation.

Once a near vision zone of the desired width has been cut, movement of the headstock is arrested and the lathe continues to cut the distance vision zone for the next ring. A further near vision zone is then cut by moving the headstock forward or back once more and the operation is repeated alternately to cut the desired number of alternating rings on the lens surface.

Figure 4A:
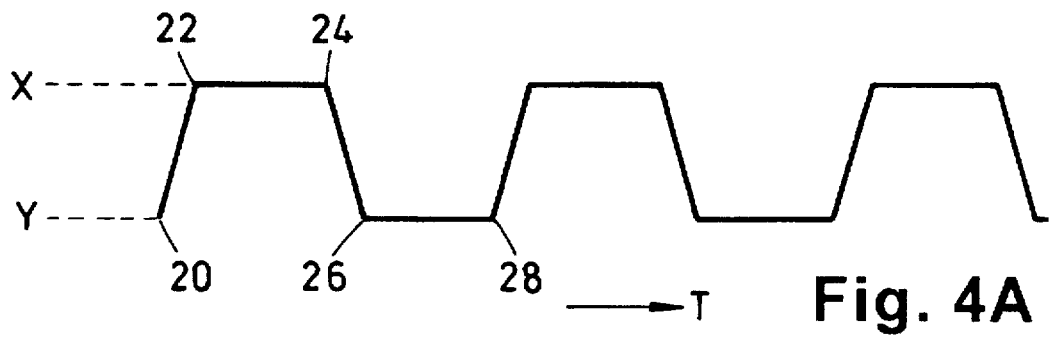
FIGS. 4A, 4B and 4C represent various movements of the headstock during the cutting of a power curve on the anterior surface of the lens.

Referring to FIG. 4A, this diagram shows the situation in which there is rapid acceleration between zero and maximum headstock movement, e.g. between point 20 and 22, after which the headstock moves back at a constant speed for a short time to point 24 and then decelerates to point 26. During this phase, the tool will cut an aspherical curve on the lens. Between points 26 and 28, the headstock remains stationary and the tool will cut a spherical curve. The process will be repeated as shown in the diagram.

Figure 4B:
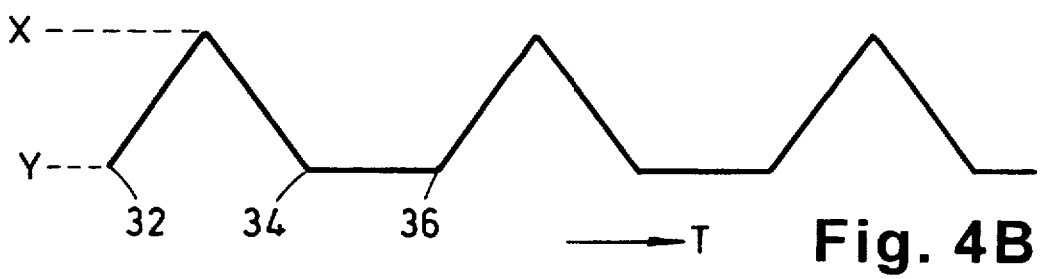

FIG. 4B shows a modified regime in which the acceleration is slower and there is no headstock movement at constant speed. An aspherical curve will mainly be cut during phase 32 to 34 and a spherical curve mainly during phase 34 to 36.

Figure 4C:
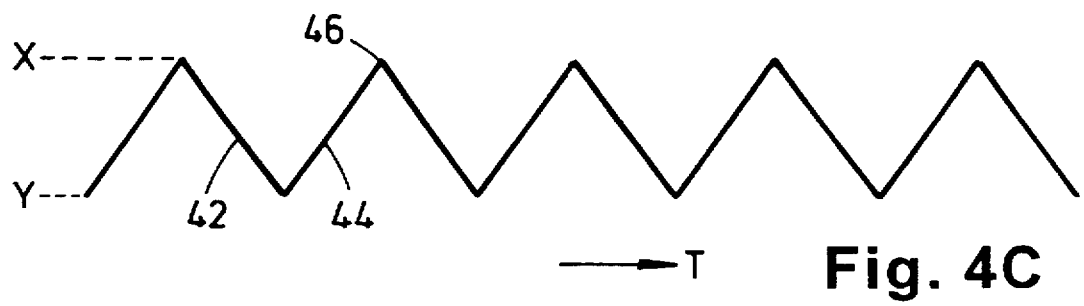

FIG. 4C shows a diagram which is similar to 4B but with no extended phase when the headstock is not moving. However, during a period when the headstock is slowing down and then starting to accelerate, e.g. the phase from about 42 to 44, the tool will cut a substantially spherical curve, while acceleration towards maximum speed at 46 will result in a substantially aspherical curve.

The diagrams in FIGS. 4A, 4B and 4C show linear accelerations but it is not essential that the headstock should be linearly accelerated.

It will be appreciated from the above that where the radius arm traverses the lens blank from the edge inwardly, the headstock will be moved back. Conversely, if the radius arm was arranged to cut from the axis outwardly towards the edge the headstock would be moved forwards.

In general, where the power curvature is set to distance, the headstock will be moved back. However, it would be possible to set the power curve to a reading prescription and move the headstock forward for the distance correction.

It will be appreciated that the movements described are very small and the successful operation of the machining steps described above require the use of a high precision computer controlled lathe.

Where the surfaces are cut on the inside of the lens, the base curve of the lens is preferably flattened slightly at the periphery so that the lens is fitted to the eye ball essentially at its periphery. This is to ensure that the tear film is maintained between the lens of the cornea and the viewing zones covered by the second viewing area.

Although the embodiment illustrated has a distance vision zone in the central circular area, this could alternatively be a reading or intermediate zone and the adjacent zone changed appropriately.

What is claim is:

1. A bifocal contact lens having a front surface and a rear surface and which comprises a plurality of substantially concentric viewing zones of alternate distance vision and near vision powers, wherein the distance vision zones each having a substantially spherical lenticular surface and the near vision zones each have a lenticular surface which is at least partially aspherical, and wherein the lenticular surfaces of the near vision zones have a continuously changing curvature in the region of junctions with an adjacent distance vision zone such that said junctions exhibit a smooth transition between near vision and distance vision zones.

2. A bifocal lens as claimed in claim 1, wherein said distance vision and near vision zones are all formed on the front surface.

3. A bifocal lens as claimed in claim 1, wherein said distance vision and near vision zone are cut on the back surface of the lens.

4. A bifocal lens as claimed in claim 2, wherein alternate distance vision and near vision zones are cut on the front surface of a lens blank, and aspherical near vision zones are cut by moving the lens blank axially, relative to a cutting tool mounted on a radius arm.

* * * * *